United States Patent
Modrzejewski et al.

(10) Patent No.: US 10,480,582 B2
(45) Date of Patent: Nov. 19, 2019

(54) ROLLER BEARING LUBRICATION SYSTEMS

(71) Applicant: Bell Helicopter Textron Inc., Fort Worth, TX (US)

(72) Inventors: Brian Stanley Modrzejewski, Keller, TX (US); Siddhesh Pradeep Raje, Fort Worth, TX (US); Kenneth Myron Jackson, Euless, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 350 days.

(21) Appl. No.: 15/340,680

(22) Filed: Nov. 1, 2016

(65) Prior Publication Data

US 2018/0119742 A1 May 3, 2018

(51) Int. Cl.
*F16C 33/66* (2006.01)
*F16C 19/54* (2006.01)

(52) U.S. Cl.
CPC ........ *F16C 33/6677* (2013.01); *F16C 19/546* (2013.01); *F16C 33/6662* (2013.01); *F16C 2326/43* (2013.01)

(58) Field of Classification Search
CPC .. F16C 19/163; F16C 19/546; F16C 33/6662; F16C 33/6677; F16C 2326/43; B64C 27/08; B64C 27/12; B64C 27/14; B64C 27/16
See application file for complete search history.

(56) References Cited

U.S. PATENT DOCUMENTS

| | | | |
|---|---|---|---|
| 5,749,660 A * | 5/1998 | Dusserre-Telmon | F16C 19/166 384/475 |
| 6,872,003 B2 * | 3/2005 | Dusserre-Telmon | F01D 25/164 384/99 |
| 9,453,535 B2 * | 9/2016 | Krause | F16C 33/664 |
| 2013/0077907 A1 * | 3/2013 | Duffy | F16C 33/6677 384/473 |
| 2016/0207619 A1 * | 7/2016 | Darrow, Jr. | B64C 27/12 |
| 2017/0145857 A1 * | 5/2017 | Pikovsky | F01D 25/18 |

\* cited by examiner

*Primary Examiner* — Phillip A Johnson
(74) *Attorney, Agent, or Firm* — Edwin S. Flores; Daniel J. Chalker; Chalker Flores, LLP

(57) ABSTRACT

The present invention includes a rolling element bearing system and method of using the same, comprising: a ball bearing comprising an inner race coupled to an inner shaft (journal) at an outer surface of the inner shaft, an outer race coupled to an outer shaft at an inner surface of the outer shaft, and a roller element disposed between the inner race and the outer race, wherein the inner race and the outer surface of the inner shaft form a pocket between a portion of the inner race and the outer surface, and the inner race comprises an orifice through the inner race to fluidly connect the pocket and the rolling element.

19 Claims, 5 Drawing Sheets

ROLLER BEARING LUBRICATION SYSTEMS

STATEMENT REGARDING FEDERALLY SPONSORED RESEARCH OR DEVELOPMENT

This invention was made partially with government support under contract number W911W6-14-2-0004. The government has certain rights in the invention.

TECHNICAL FIELD

This disclosure relates to rolling element bearing systems, in particular, lubrication systems for rolling element bearing systems.

BACKGROUND

Rolling element bearings are used in a variety of applications, for example, in rotating shaft applications. Rolling element bearings, such as ball bearings, cylindrical roller bearings, spherical bearings, and other roller bearing types, typically require within the bearings to lubricate the rolling elements, reduce friction on the bearing contact surfaces, and dissipate heat that is generated within the rolling element bearing, among other reasons. Sometimes, in high speed rolling element bearings, a continuous supply of lubrication fluid is needed to sufficiently lubricate the rolling elements, and dissipate heat to avoid bearing failure.

SUMMARY

This disclosure describes lubrication of rolling element bearings, for example, between rotating shafts in rotor systems of rotorcraft or other aircraft.

In one embodiment, the present invention includes a rolling element bearing system, comprising: a ball bearing comprising an inner race coupled to an inner shaft (journal) at an outer surface of the inner shaft, an outer race coupled to an outer shaft at an inner surface of the outer shaft, and a roller element disposed between the inner race and the outer race, wherein the inner race and the outer surface of the inner shaft form a pocket between a portion of the inner race and the outer surface, and the inner race comprises an orifice through the inner race to fluidly connect the pocket and the rolling element. In one aspect, the portion of the inner race that forms the pocket is an unloaded portion of the inner race. In another aspect, the pocket is accessible from a space between the inner shaft and the outer shaft. In another aspect, the inner race comprises an insert protruding from a first end of the inner race to partially close the pocket. In another aspect, the insert comprises an angled surface configured to direct a pool of lubrication fluid toward the access hole in the inner race. In another aspect, the insert is at least one of press-fit, thermally fit, threaded, bonded, welded, or adhered to the inner race. In another aspect, the insert is integral to the inner race. In another aspect, the insert is machined into the inner race. In another aspect, the inner shaft comprises a depression in the outer surface of the inner shaft to form the pocket. In another aspect, the rolling element bearing system further comprises a spacer element between the inner race and the outer surface of the inner shaft, wherein the spacer element forms a portion of the pocket. In another aspect, the outer shaft is disposed about the inner shaft and concentric with a central axis of the inner shaft. In another aspect, the rolling element bearing system further comprises a lubrication jet configured to supply lubrication fluid to the pocket. In another aspect, the access hole extending through the inner race forms an acute angle to a radial of the roller element. In another aspect, a first end of the access hole opens to a bearing surface of the roller element on the inner race, the first end of the access hole disposed out of a load path of the roller element on the bearing surface. In another aspect, the roller element is a ball bearing. In another aspect, the rolling element bearing system further comprises a fastener disposed on the inner shaft and adjacent the inner race to hold the inner race in place on the inner shaft. In another aspect, the inner shaft is a drive shaft of a rotorcraft.

In another embodiment, the present invention includes a method comprising: directing a flow of lubrication fluid into a pocket formed between an inner shaft and a portion of an inner race of a roller bearing, the inner race coupled to the inner shaft at an outer surface of the inner shaft, the roller bearing further comprising an outer race coupled to an outer shaft at an inner surface of the outer shaft; and directing the flow of lubrication fluid through an access hole in the inner race, the access hole extending between the pocket and a bearing surface of the inner race, the bearing surface configured to support a load from a roller element disposed between the inner race and the outer race. In one aspect, method further comprises, in response to directing the flow of lubrication fluid into the pocket, constraining the flow of lubrication fluid within the pocket with an insert protruding from an end of the inner race to partially close the pocket during rotation of the inner shaft above a threshold rotational speed. In another aspect, the method further comprises directing, with an angled surface of the insert, the flow of lubrication fluid within the pocket toward the access hole. In another aspect, the step of directing a flow of lubrication fluid into a pocket comprises injecting the flow of lubrication fluid from a lubrication jet into the pocket. In another aspect, the step of directing a flow of lubrication fluid into a pocket formed between an inner shaft and a portion of an inner race of a roller bearing comprises directing the flow of lubrication fluid into the pocket formed by the inner race and a depression in the inner shaft adjacent an unloaded portion of the inner race. In another aspect, the method further comprises supplying the flow of lubrication fluid from the access hole to the roller element in contact with the bearing surface.

Yet another embodiment of the present invention includes a rolling element bearing system, comprising: a ball bearing comprising an inner race, an outer race, and a roller element disposed between the inner race and the outer race; and an inner shaft coupled to the inner race and forming a pocket between a portion of the inner race and the inner shaft, wherein the inner race comprising an access hole extending between the pocket and the roller element to fluidly connect the pocket and the roller element. In one aspect, the inner race comprises an insert protruding from a first end of the inner race to partially close the pocket, the insert comprising an angled surface configured to direct a pool of lubrication fluid in the pocket toward the access hole in the inner race. In another aspect, the inner shaft comprises a depression adjacent the portion of the inner race to form the pocket.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes lubrication systems for rolling element bearings, which direct lubrication fluid to rolling elements of the rolling element bearings. For example, a lubrication system described herein directs and holds lubrication fluid in a pocket formed between a bearing race of a rolling element bearing and the rotating journal (e.g., shaft), and further directs the lubrication fluid from the pocket to a bearing surface of the rolling element bearing. The pocket is formed between a portion of the bearing race (e.g., inner bearing race) and a rotating component (e.g., journal or rotating inner shaft). When the bearing race is rotating, the pocket holds a pool of lubrication fluid. Cetrifugal forces acting on this lubricant pool direct the fluid to flow through an orifice in the bearing race to the bearing surface, for example, to supply the lubrication fluid to a rolling element of the rolling element bearing. The pocket and orifice of the lubrication system can be configured to control a flow rate, flow volume, and/or other characteristic of the lubrication fluid to the roller element. For example, the geometry and size of the orifice and the pocket allows for control of the lubrication fluid flow to the roller bearing. For example, for the same geometry and size of orifice, lube flow can be controlled by changing the number of orifices formed. In examples in which the shaft spins, rotation of the rotating component, or rotating inner shaft, creates centrifugal forces that bias (e.g., force) the lubrication fluid in the pocket toward and through the access hole.

In some conventional lubrication systems, a flow of lubrication fluid is provided from an oil jet located within an inside diameter of a bearing shaft journal. Generally, a bearing journal refers to the inner shaft that interfaces with the inner race. However, some conventional lubrication systems are constrained by geometric constrains, spatial constraints, shaft speed (e.g., rotational speed), or other factors, such that lubrication fluid cannot be introduced into the bearing via the inside diameter of the rotating shaft bearing journal. The present disclosure describes lubrication systems that provide controlled application of lubrication fluid to a roller bearing, for example, in confined geometric and spatial constraints and/or at high shaft speeds (e.g., greater than 1,000-10,000 revolutions per minute (rpm)).

Figure 1:
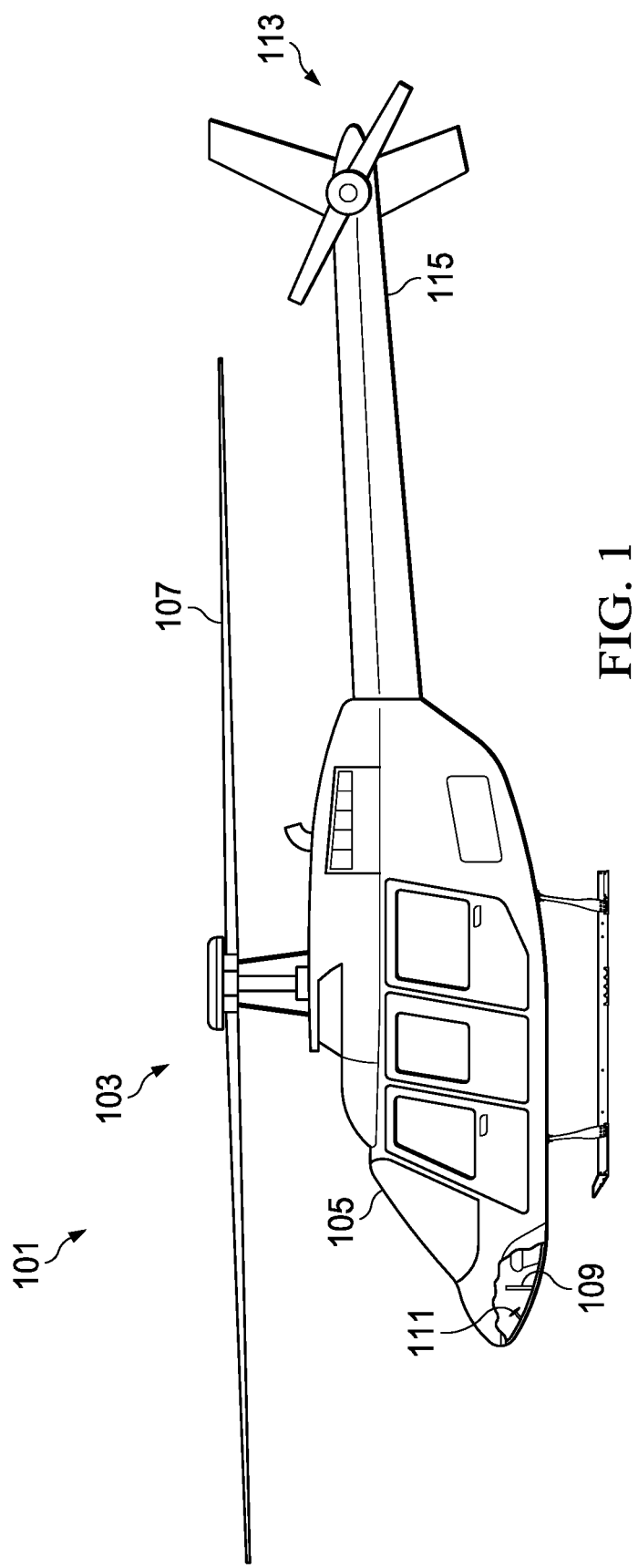
FIG. 1 is a schematic side view of an example helicopter.
Figure 2:
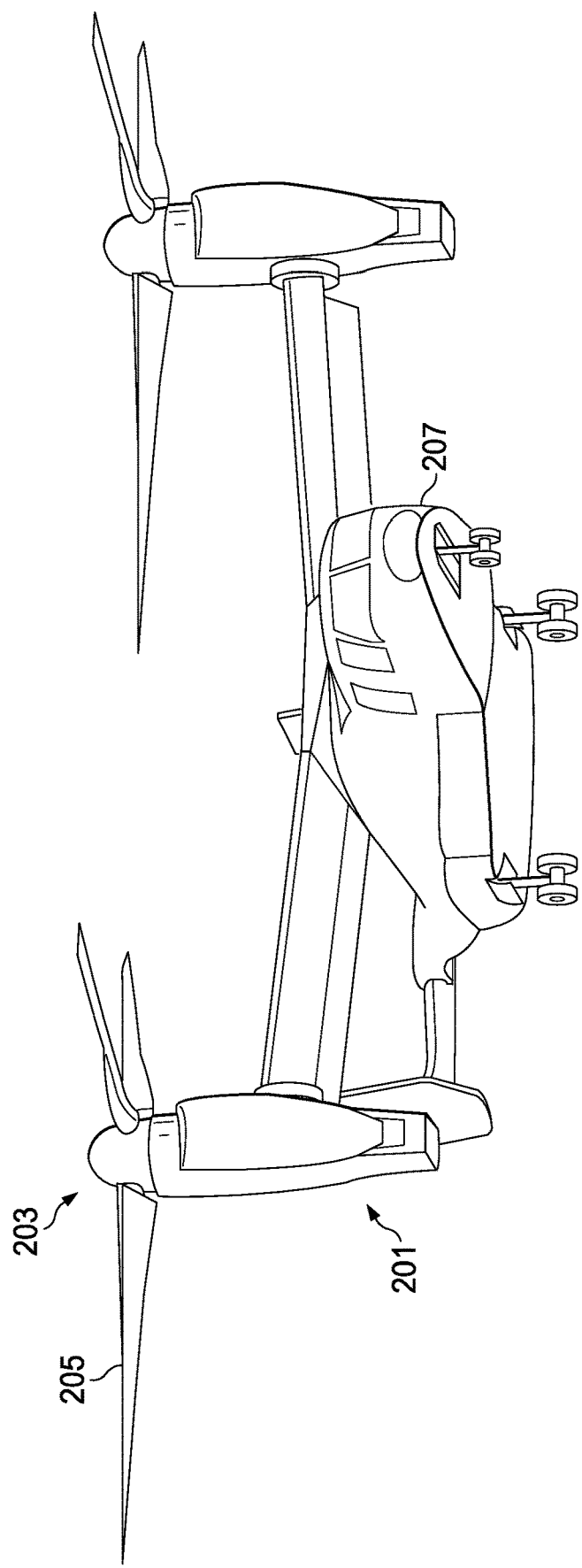
FIG. 2 is a schematic side view of an example tiltrotor aircraft.

FIGS. 1 and 2 are schematic diagrams of two different rotorcrafts. FIGS. 1 and 2 show an example helicopter 101 and an example tiltrotor aircraft 201, respectively, and each can utilize a rolling element bearing lubrication system as described herein. However, this disclosure is applicable to any aircraft, rotorcraft, gearbox, or shaft assembly that includes a lubricated rolling element bearing used to support a rotating shaft.

FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate the cyclic controller 109 for changing the pitch angle of rotor blades 107 and/or manipulate pedals 111, thus providing vertical, horizontal, and yaw flight movement. Helicopter 101 can further include an anti-torque system 113 and an empennage 115. The rotary system 103 and/or the anti-torque system 113 can include a roller bearing system and associated lubrication system, for example, to lubricate roller bearings between shaft elements of the rotary system 103 and/or anti-torque system 113.

Tiltrotor aircraft 201 of FIG. 2 includes two or more rotary systems 203 having multiple proprotors 205 and carried by rotatable nacelles. The rotatable nacelles provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft. The rotary systems 203 can include a roller bearing system and associated lubrication system, for example, to lubricate roller bearings between shaft elements of the rotary systems 203.

Figure 3:
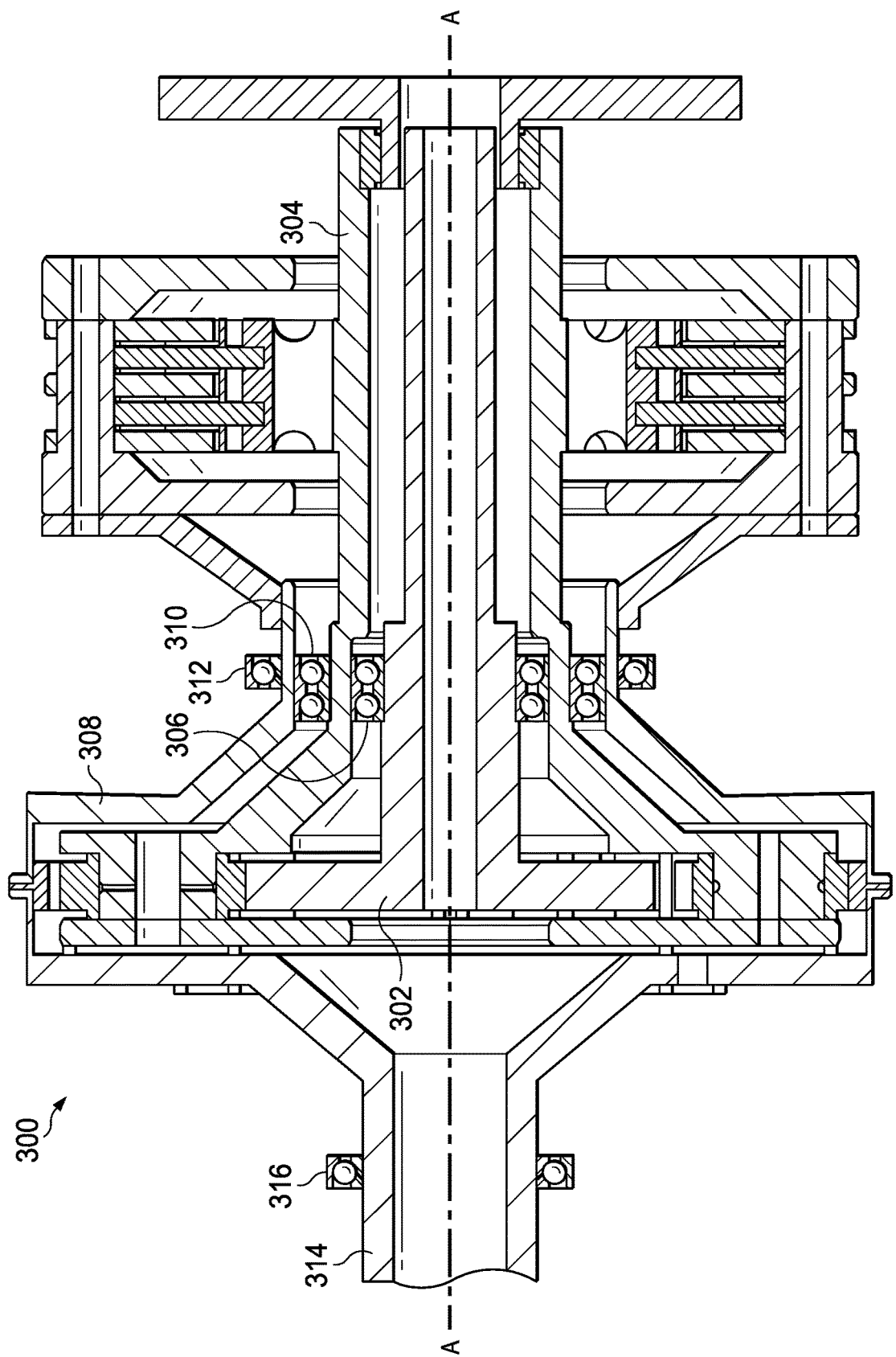
FIG. 3 is a cross-sectional side view of an example rotor shaft system.

FIG. 3 is a cross-sectional side view of an example rotor shaft system 300 that can be used in the rotary system 103 or anti-torque system 113 of example helicopter 101 of FIG. 1, in the rotary systems 203 of example tiltrotor aircraft 201 of FIG. 2, or in other rotary systems. Generally, the rotor shaft system 300 includes a plurality of roller bearings between multiple rotating shaft elements. In this example, the rotor shaft system 300 includes a first shaft element 302, a second shaft element 304, a first roller bearing 306 between the first shaft element 302 and the second shaft element 304, a third shaft element 308, a second roller bearing 310 between the second shaft element and the third shaft element 308, and a third roller bearing 312. The first shaft element 302, the second shaft element 304, and the third shaft element 308 are each concentric shaft elements oriented about a shared central axis A-A, with the first shaft element 302 being the radially innermost shaft element, and the third shaft element 308 being the radially outermost shaft element with reference to axis A-A. The first roller bearing 306 and second roller bearing 310 allow for relative rotation between the three shaft elements 302, 304, and 308. The rotor shaft system 300 also includes a drive shaft 314 connected to the third shaft element 308, and drive shaft roller bearing 316 on an outer surface of the drive shaft 314. The drive shaft 314 can connect to an engine, gearbox shaft, or other power input to provide rotation of the drive shaft 314. In one implementation, the drive shaft 314 is configured for high speed rotation (e.g., between about 1,000 to 5,000 rpm), and drives the third shaft element 308 to rotate. A housing, outer shaft element, or other element can rotatably couple to the drive shaft 314 and/or the third shaft element 308 via the drive shaft roller bearing 316 and/or the third roller bearing 312.

One or more or all of the rolling element bearings of the rotor shaft system 300 can include a lubrication system to lubricate the rolling element bearings. For example, the drive shaft ball bearing 316 and/or the third ball bearing 312 can include a lubrication system utilizing centrifugal force assisted inner raceway lubrication.

Figure 4:
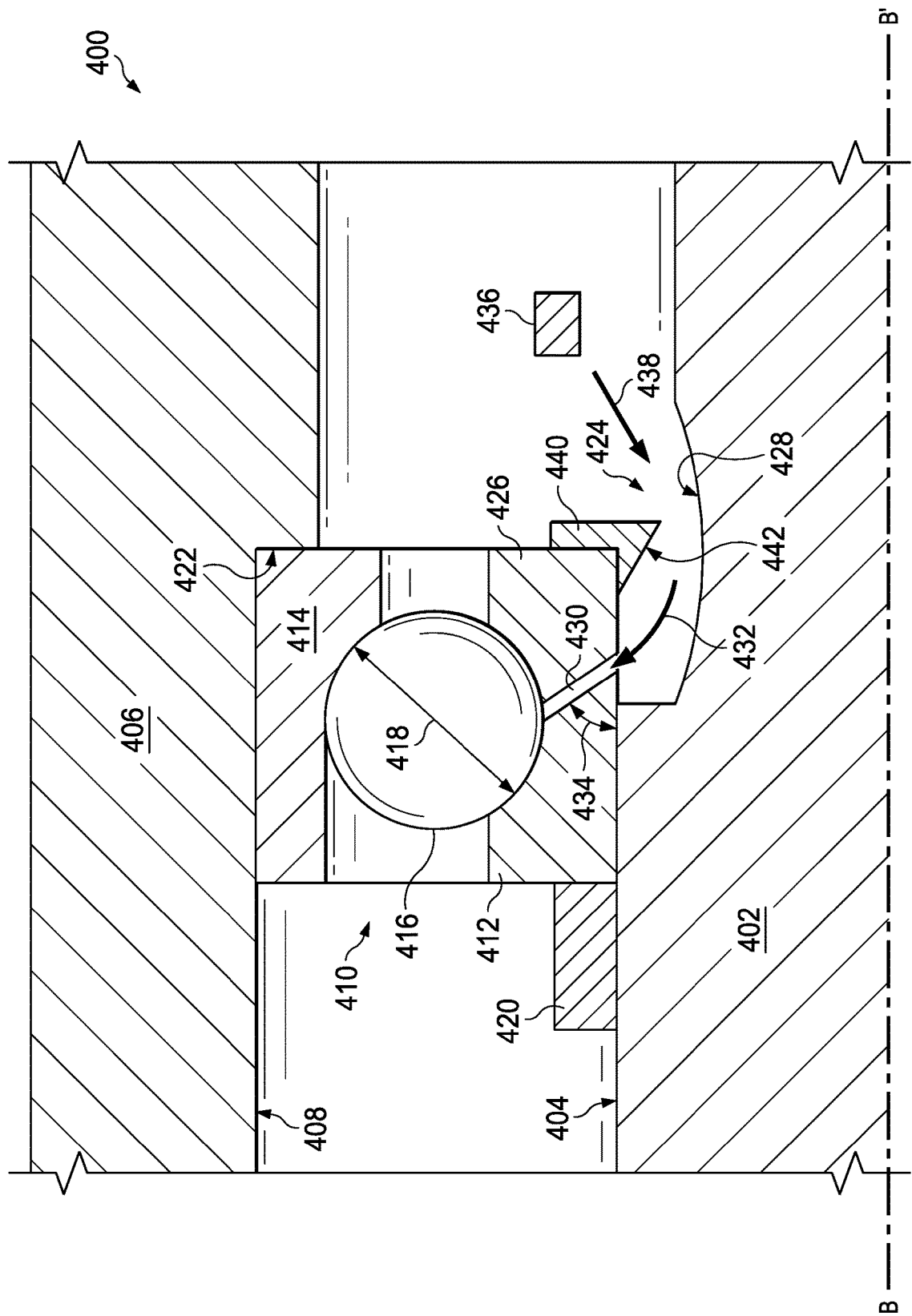
FIG. 4 is a schematic partial cross-sectional side view of an example roller bearing system.

FIG. 4 is a schematic partial cross-sectional side view of an example rolling element bearing system 400 with a lubrication system, for example, that employs centrifugal force assisted inner raceway lubrication. In other words, the example rolling element bearing system 400 can utilize centrifugal forces of a rotating journal and bearing inner race to direct lubrication to the rolling elements inside of the bearing. The example rolling element bearing system 400 can be used in the exemplary rotor shaft system 300 of FIG. 3. The rolling element bearing system 400 includes an inner shaft (journal) 402, an outer shaft 406, and a ball bearing 410 between the inner shaft 402 and the outer shaft 406. In some examples, the inner shaft 402 can be a drive shaft of a rotorcraft, such as drive shaft 314 of FIG. 3. The rolling element bearing 410 allows for relative rotation between the inner shaft 402 and the outer shaft 406, while radially supporting the outer shaft 406 and inner shaft 402 normal to axis B-B and axially supporting the outer shaft 406 and inner shaft 402 parallel to axis B-B. The rolling element bearing 410 includes an inner bearing race 412 attached to an outer surface 404 of the inner shaft (journal) 402, an outer bearing race 414 attached to an inner surface 408 of the outer shaft 406, and a rolling element 416 disposed between the inner bearing race (journal) 412 and the outer bearing race 414. The rolling element 416 is configured to roll and bear on bearing contact surfaces of the inner race 412 and the outer race 414. For example, a contact angle arrow 418 indicates an example contact angle of the bearing load of the roller element 416 on the bearing contact surfaces of the inner race 412 and the outer race 414 during operation of the roller bearing 410. For example, the rolling element bearing 410 provides radial and axial support between the outer shaft 406 and the inner shaft 402 along contact angle arrow 418 while allowing relative rotation between the outer shaft 406 and inner shaft 402. The rolling element bearing 410 of FIG. 4 is depicted as a ball bearing with a ball as the rolling element 416; however, the rolling element bearing 410 can include a different bearing type. For example, the rolling element bearing 410 can be a cylindrical roller bearing, spherical roller bearing, tapered roller bearing, needle bearing, and ball bearing or another rolling element bearing type. In some implementations, the inner shaft 402 and the outer shaft 406 are cylindrical (substantially or wholly), and are oriented concentrically about axis B-B.

In some implementations, the rolling element bearing system 400 includes a fastener (e.g., nut 420) coupled to the inner shaft 402 about the inner shaft 402 and abutting the inner race 412 of the rolling element bearing 410 to axially support and/or pre-load the inner race 412 on the inner shaft 402. The fastener, or nut 420, can be coupled to the inner shaft 402 in a variety of ways, such as threaded, adhered, welded, machined, or otherwise attached to the inner shaft 402. In certain implementations, the inner shaft 402 includes a shoulder (not shown) to support the inner race 412 on the inner shaft 402, for example, instead of or in addition to the nut 420. Similarly, outer shaft 406 includes a shoulder 422 abutting and axially supporting the outer race 414. In certain implementations, the rolling element bearing system 400 can include a fastener or nut (not shown) coupled to (e.g., threaded to, adhered to, welded to, machined into or otherwise attached to) the inner surface 408 of the outer shaft 406 in addition to or instead of the shoulder 422 to axially support the outer race 414 of the roller bearing 410.

The inner race 412 of the rolling element bearing 410 and the outer surface 404 of the inner shaft 402 form a pocket 424 between a portion of the inner race 412 and the outer surface 404. The inner race 412 also includes an orifice 430 extending though the inner race to fluidly connect the pocket 424 and the rolling element 416. The pocket 424 is configured to hold a pool of lubrication fluid, and the access hole 430 allows the lubrication fluid to flow from the pocket 424 through the orifice 430 and to the bearing contact surface of the inner race 412. This flow of lubrication fluid is indicated by arrows 432 in FIG. 4. The inner shaft 402 is configured to rotate about axis B-B, for example, at very high speeds (e.g., more than 8,000 RPM). The rotation of the inner shaft 402 creates centrifugal force acting radially outward from the axis B-B, which acts to force the pool of lubrication fluid to a radially outward side (e.g., radially outward with respect to axis B-B) of the pocket 424 and toward the orifice 430. For example, a rotational speed of the inner shaft 402 above a minimum threshold speed forces the pool of lubrication fluid toward the radially outward side of the pocket 424. This minimum threshold speed can vary based on the size of the inner shaft 402, the, mass of the lubrication fluid, lubrication fluid type, and/or other factors. The size and rotational speed of the inner shaft 402 determines the centrifugal force acting on the lubrication pool in the pocket 424. The size and geometry of the pocket 424 can also affect the pressure acting on the lubrication fluid. For example, when the shaft is rotating, the flow of lubrication is induced by centrifugal forces acting on the pool of oil. The flow is metered and directed by the orifice 430 such that the pool of oil lubricates the rolling element 416 through the contact surface of the rolling element bearing 410. The size (e.g., diameter) and geometry of the orifice 430 can also affect the flow rate and flow volume of the lubrication fluid through the access hole 430. In some implementations, controlling one or more of the rotational speed of the inner shaft 402, the size of the access hole 430, or the geometry of the access hole 430 can control the flow of the lubrication fluid to the roller element 416 of the roller bearing 410. In some examples, such as in rotorcraft shaft assemblies, the inner shaft 402 rotates at a predictable and/or substantially constant speed during operation. In these examples, the geometry and/or size of the access hole 430 can be designed to provide a desired amount and flow of lubrication fluid to the rolling element bearing 410, for example, based on the predictable and/or substantially constant rotational speed of the inner shaft 402 during operation.

The portion of the inner race 412 that, at least in part, forms an outer peripheral edge of the pocket 424 is an unsupported and unloaded portion 426 of the inner race 412. The roller element 416 and the inner race 412 are fully supported (e.g., by the inner shaft 402) in a loaded zone of the rolling element bearing 410. For example, the portion of the bearing surface of the inner race 412 that supports a contact zone (e.g., end of contact angle arrow 418) is fully supported in a radial direction by the outer surface 404 of the inner shaft 402, and fully supported in a axial direction (e.g., by the nut 420). In the example rolling element bearing system 400 of FIG. 4, an inner peripheral edge of the pocket 424 is formed, at least in part, by a circumferential groove 428 in the outer surface 404 of the inner shaft 402 radially inward of the unloaded portion 426 of the inner race 412. The groove 428 is shown as a concave channel in the inner shaft 402. However, this groove 428 can take a variety of other forms, such as a squared, a triangular, or another shaped groove. In some implementations, such as shown in FIG. 4, the groove 428 extends between a first portion of the inner shaft 402 with a first diameter and a second portion of the inner shaft 402 with a second, greater diameter.

FIG. 4 shows the orifice 430 as angled from a location in the pocket 424 to a location on the bearing contact surface of the inner race 412 that is offset from the location in the pocket 424 and toward the contact load point of the roller element 416 on the inner race 412. This angle 434, depicted in FIG. 4 as relative to the outer surface 404 of the inner shaft 402, can be designed based on a desired flow rate of lubrication fluid, roller bearing size, shaft speed, and/or other factor in order to sufficiently lubricate the roller element 416 of the roller bearing 410. The end of the orifice 430 on the bearing surface of the inner race 412 is disposed out of the contact zone, or load path, of the roller element 416 on the bearing surface. For example, the orifice 430 is angled from the pocket 424 toward the loaded zone of the rolling element 416, but does not extend into the loaded zone of the rolling element 416. Instead, the orifice 430 extends from the pocket 424 to the unloaded zone of the bearing surface of the inner race 412, but the opening of the orifice 430 in the bearing surface directs lubrication fluid toward the loaded zone of the rolling element 416 on the bearing contact surface of the inner race 412. In some instances, the orifice 430 is angularly offset from a radial of the roller element 416, and forms an acute angle with the radial of the roller element 416 such that a flow path of the lubrication fluid supplied from the access hole 430 to the bearing surface is not directed straight toward a radial center of the roller element 416. In some implementations, the orifice 430 is angled differently than shown in FIG. 4. For example, the orifice 430 can be perpendicular to axis B-B.

The pocket 424 is accessible from a space between the inner shaft 402 and the outer shaft 406, for example, adjacent the rolling element bearing 410. A lubrication applicator 436 disposed in the space between the inner shaft 402 and the outer shaft 406 can supply lubrication fluid to the pocket 424 through the open end of the pocket 424. Lubrication fluid can be supplied to the pocket 424 in a variety of ways, such as by oil misting, jetting, channeling, splash lubrication, a combination of these, or another way. In some implementations, the lubrication applicator 436 includes a lubrication jet, oil jet, or other lubrication applicator with a nozzle aimed toward the open end of the pocket 424.

The nozzle can be angled at least slightly toward a portion of the outer surface 404 of the inner shaft 402 that is within the pocket 424, for example, such that centrifugal force from rotation of the inner shaft 402 forces the lubrication fluid from the outer surface 404 of the inner shaft 402 within the pocket 424 to the radially outward side of the pocket 424 proximate the inner race 412. An example flow path of lubrication fluid from the lubrication applicator into the pocket is exemplified by arrow 438.

In some implementations, the rolling element bearing system 400 includes an insert 440 protruding radially inward from an end of the unloaded portion 426 of the inner race 412. The insert 440 partially closes the pocket 424, for example, to trap a pool of lubrication fluid within the pocket 424. For example, during rotation of the inner shaft 402 above the minimum threshold speed to create a centrifugal force to pressure the lubrication fluid toward the radially outward side of the pocket 424, the insert 440 acts to hold (e.g., contain, constrain, or otherwise keep) the lubrication fluid within the pocket 424. The insert 440 can also bias the pool of lubrication fluid disposed in the pocket 424 toward the access hole 430 in the inner race 412. In the example roller bearing system 400 of FIG. 4, the insert 440 includes a biasing surface 442 angled toward the orifice 430 to direct, guide, or otherwise bias the pool of lubrication fluid toward the orifice 430 and away from the open end of the pocket 424. The biasing surface 442 can include a flat profile, a curved profile, or another profile that directs lubrication flow toward the orifice 430. In some instances, such as depicted in FIG. 4, an end of the biasing surface 442 is located adjacent to the orifice 430. However, the insert 440 can take many forms. For example, the insert 440 can include a flange, or other shaped projection, extending radially inward from the end of the inner race 412. In some implementations, the insert 440 is press-fit, thermally fit, threaded, bonded, welded, adhered, or otherwise connected to the inner race 412. In certain instances, the insert 440 is integral to the inner race 412. For example, the insert 440 can be machined into the inner race 412, or the inner race 412 can be manufactured with a protruding end in the shape of the insert 440.

In the example rolling element bearing system 400 of FIG. 4, the pocket 424 is formed, at least in part, from the circumferential groove 428 in the inner shaft 102 and the overhanging, unloaded portion 426 of the inner race 412 disposed over the groove 428. However, the pocket 424 can be formed in other ways. In some implementations, the inner shaft 402 can exclude the groove 428. For example, a spacer can be disposed between the loaded portion of the inner race 412 and the outer surface 404 of the inner shaft 402, where the pocket 424 is formed by the outer surface 404 of the inner shaft 402, an end surface of the spacer, and the unloaded portion 426 of the inner race 412. In another example, a shoulder of the inner shaft 402 can support the loaded portion of the inner race 412, and the unloaded portion 426 of the inner race 412 overhangs the shoulder such that the pocket 424 is formed by the outer surface 404 of the inner shaft 402, the inner race 412, and an end surface of the shoulder.

Figure 5:
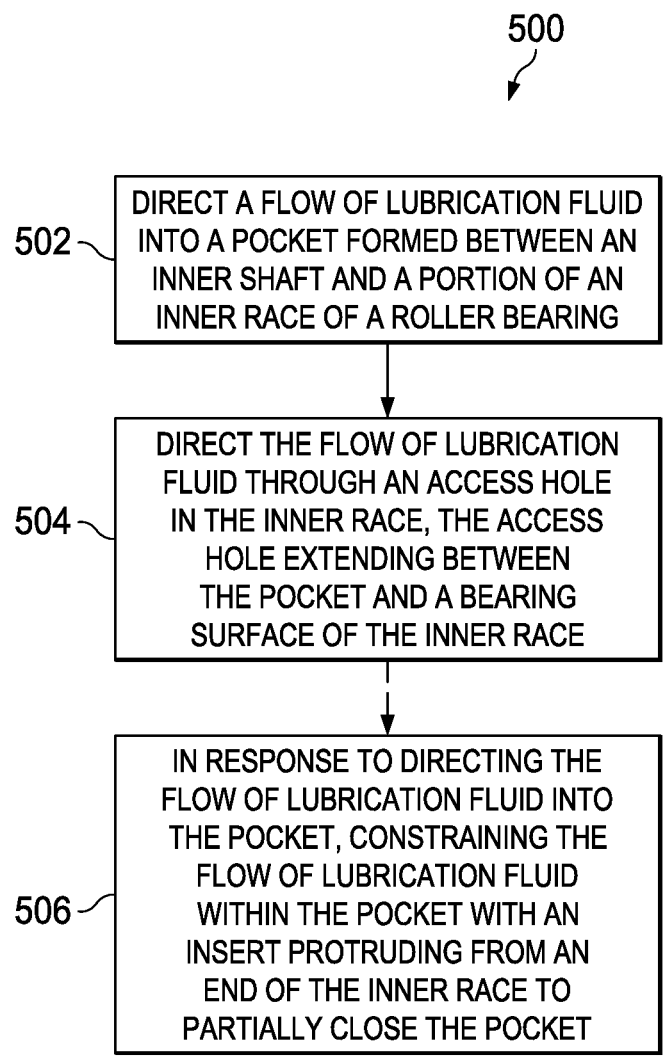
FIG. 5 is a flowchart describing an example method for lubricating a rolling element bearing system.

FIG. 5 is an example flowchart describing an example method 500 for lubricating a roller bearing system, for example, performed by the roller bearing system 400 of FIG. 4. At 502, a flow of lubrication fluid is directed into a pocket formed between an inner shaft (journal) and a portion of an inner race of a rolling element bearing. The inner race is coupled to the inner shaft (journal) at an outer surface of the inner shaft (journal), and the rolling element bearing includes an outer race coupled to an outer shaft at an inner surface of the outer shaft. At 504, the flow of lubrication fluid is directed through an access hole in the inner race, where the access hole extends between the pocket and a bearing surface of the inner race. The bearing surface is configured to support a load from a roller element disposed between the inner race and the outer race. For example, when the shaft is rotating, the flow of lubrication is induced by centrifugal forces acting on the pool of oil. The flow is metered and directed by the orifice 430 such that the pool of oil lubricates the rolling element 416 through the contact surface of the rolling element bearing 410. In some instances, the method 500 continues at step 506 where, in response to directing the flow of lubrication fluid into the pocket, the flow of lubrication fluid is held within the pocket with an insert protruding from an end of the inner race to partially close the pocket.

A number of implementations have been described. Nevertheless, it will be understood that various modifications may be made without departing from the spirit and scope of the disclosure.

What is claimed is:
1. A rolling element bearing system, comprising:
 a ball bearing comprising an inner race coupled to an inner shaft (journal) at an outer surface of the inner shaft, an outer race coupled to an outer shaft at an inner surface of the outer shaft, and a roller element disposed between the inner race and the outer race,
 wherein the inner race and the outer surface of the inner shaft form a pocket between a portion of the inner race and the outer surface, and the inner race comprises an orifice through the inner race to fluidly connect the pocket and the rolling element, and wherein the inner race comprises an insert protruding from a first end of the inner race to partially close the pocket.

2. The rolling element bearing system of claim 1, wherein the portion of the inner race that forms the pocket is an unloaded portion of the inner race.

3. The rolling element bearing system of claim 1, wherein the pocket is accessible from a space between the inner shaft and the outer shaft.

4. The rolling element bearing system of claim 1, wherein the insert comprises an angled surface configured to direct a pool of lubrication fluid toward the access hole in the inner race.

5. The rolling element bearing system of claim 1, wherein the insert is at least one of press-fit, thermally fit, threaded, bonded, welded, or adhered to the inner race.

6. The rolling element bearing system of claim 1, wherein the insert is integral to the inner race.

7. The rolling element bearing system of claim 6, wherein the insert is machined into the inner race.

8. The rolling element bearing system of claim 1, wherein the inner shaft comprises a depression in the outer surface of the inner shaft to form the pocket.

9. The rolling element bearing system of claim 1, comprising a spacer element between the inner race and the outer surface of the inner shaft, wherein the spacer element forms a portion of the pocket.

10. The rolling element bearing system of claim 1, wherein the outer shaft is disposed about the inner shaft and concentric with a central axis of the inner shaft.

11. The rolling element bearing system of claim 1, comprising a lubrication jet configured to supply lubrication fluid to the pocket.

12. The rolling element bearing of claim 1, wherein an access hole extending through the inner race forms an acute angle to a radial of the roller element.

13. The rolling element bearing of claim 1, wherein a first end of the access hole opens to a bearing surface of the roller element on the inner race, the first end of an access hole disposed out of a load path of the roller element on the bearing surface.

14. The rolling element bearing of claim 1, wherein the roller element bearing system is a ball bearing.

15. The rolling element bearing system of claim 1, comprising a fastener disposed on the inner shaft and adjacent the inner race to hold the inner race in place on the inner shaft.

16. The rolling element bearing system of claim 1, wherein the inner shaft is defined further as a drive shaft of a rotorcraft.

17. A rolling element bearing system, comprising:
a ball bearing comprising an inner race, an outer race, and a roller element disposed between the inner race and the outer race; and
an inner shaft coupled to the inner race and forming a pocket between a portion of the inner race and the inner shaft, wherein the inner race comprises an insert protruding from a first end of the inner race to partially close the pocket, and wherein the inner race comprising an access hole extending between the pocket and the roller element to fluidly connect the pocket and the roller element.

18. The rolling element bearing system of claim 17, wherein the inner race comprises an insert protruding from a first end of the inner race to partially close the pocket, the insert comprising an angled surface configured to direct a pool of lubrication fluid in the pocket toward the access hole in the inner race.

19. The rolling element bearing system of claim 17, wherein the inner shaft comprises a depression adjacent the portion of the inner race to form the pocket.

* * * * *